US009431807B2

(12) United States Patent
Akahori et al.

(10) Patent No.: US 9,431,807 B2
(45) Date of Patent: Aug. 30, 2016

(54) BOOSTER CABLE HOLDING STRUCTURE

(71) Applicant: YAZAKI CORPORATION, Tokyo (JP)

(72) Inventors: Masahiro Akahori, Shizuoka (JP); Kimiaki Nakajima, Aichi (JP); Shinya Kai, Aichi (JP); Akihito Tsukamoto, Aichi (JP); Yuuji Fukuyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 112 days.

(21) Appl. No.: 14/313,631

(22) Filed: Jun. 24, 2014

(65) Prior Publication Data

US 2014/0374139 A1     Dec. 25, 2014

(30) Foreign Application Priority Data

Jun. 25, 2013    (JP) ................................ 2013-132389

(51) Int. Cl.

| | |
|---|---|
| *B60R 16/03* | (2006.01) |
| *H01R 9/24* | (2006.01) |
| *H02G 3/16* | (2006.01) |
| *B60R 16/023* | (2006.01) |
| *H01R 11/28* | (2006.01) |
| *B60R 16/02* | (2006.01) |

(Continued)

(52) U.S. Cl.

CPC ................. *H02G 3/16* (2013.01); *B60R 16/02* (2013.01); *B60R 16/0238* (2013.01); *H01R 11/287* (2013.01); *H01H 2085/208* (2013.01); *H01R 9/223* (2013.01); *H01R 11/24* (2013.01)

(58) Field of Classification Search
CPC ........ H02G 3/32; H02G 3/16; H01R 13/639; H01R 13/62; H01R 11/24; H01R 9/2466; H01R 11/287; H01R 33/94; B60R 16/02; B60R 16/0238; H01M 2/20; H05K 7/026
USPC ........ 174/135, 50, 520, 594; 439/76.2, 709, 439/754
See application file for complete search history.

(56) References Cited

U.S. PATENT DOCUMENTS

| | | | |
|---|---|---|---|
| 6,679,708 B1 * | 1/2004 | Depp ................... | H01R 9/2466 361/752 |
| 7,785,116 B2 * | 8/2010 | Akahori ................ | H01H 85/20 439/76.2 |

(Continued)

FOREIGN PATENT DOCUMENTS

| | | |
|---|---|---|
| CN | 1885651 A | 12/2006 |
| CN | 101552329 A | 10/2009 |

(Continued)

OTHER PUBLICATIONS

Chinese Office Action for the related Chinese Patent Application No. 201410287573.7 dated Feb. 16, 2016.

*Primary Examiner* — Dimary Lopez Cruz
(74) *Attorney, Agent, or Firm* — Kenealy Vaidya LLP

(57) ABSTRACT

In a booster cable holding structure, a resin terminal supporting portion includes a tooth-edge surrounding wall on a pressed surface thereof to be pressed by a plurality of teeth arranged in a width direction of a pressing surface of a clip in a state the clip clamps a clamping connection portion, a wall inner surface of the tooth-edge surrounding wall closely surrounds each edge of at least two of the teeth of the clip or closely surrounds the edges of the at least two teeth together.

6 Claims, 8 Drawing Sheets

(51) Int. Cl.
*H01R 9/22* (2006.01)
*H01R 11/24* (2006.01)
*H01H 85/20* (2006.01)

(56) References Cited

U.S. PATENT DOCUMENTS 8,210,896 B2 * 7/2012 Wittenberg ............ A63H 3/006
434/393

8,395,061 B2 * 3/2013 Asao ........................ H02G 3/16
174/50

2009/0253311 A1 10/2009 Akahori et al.

FOREIGN PATENT DOCUMENTS

| JP | 2002-330527 A | | 11/2002 |
|---|---|---|---|
| JP | 4113756 B2 | | 7/2008 |
| JP | 2009-252453 A | | 10/2009 |
| JP | 2010093955 | * | 4/2010 |

* cited by examiner

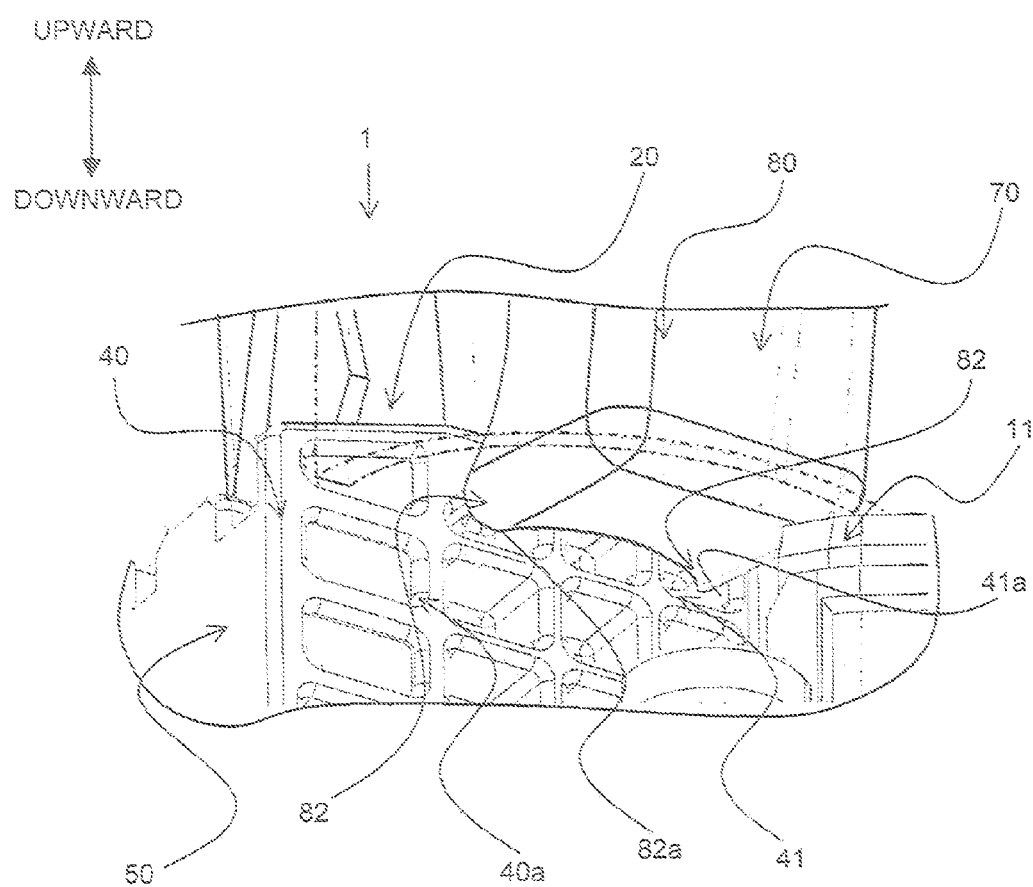

BOOSTER CABLE HOLDING STRUCTURE

CROSS-REFERENCE TO RELATED APPLICATIONS

The present application claims priority to and incorporates by reference the entire contents of Japanese Patent Application No. 2013-132389 filed in Japan on Jun. 25, 2013.

BACKGROUND OF THE INVENTION

1. Field of the Invention

The present invention relates to a booster cable holding structure that holds connection of a booster cable to a relief terminal.

2. Description of the Related Art

Conventional vehicles are equipped with a battery to start the engine and supply electricity to electric equipment such as a lamp. The battery is connected to an electrical junction box having relays, fuses, and the like with a power wire and supplies electricity to electric equipment and other components through the electrical junction box.

In recent years, vehicle-mounted batteries have increased in size corresponding to specifications of electric vehicles. This causes a tendency to change the installation place of a battery from the engine room to, for example, the trunk room.

When the battery is dead, it is necessary to open the trunk room accommodating the battery and connect a booster cable to the battery. The battery is, however, disposed in an accommodation space inside an interior material of the trunk room. The interior material needs to be removed, and this makes the work complicated.

To address such a problem, Japanese Patent Application Laid-open No. 2009-252453, for example, describes an electrical junction box for charging a battery through the electrical junction box by connecting a booster cable to a relief terminal provided to the electrical junction box instead of connecting the cable to the battery.

In the structure of the relief terminal described in Japanese Patent Application Laid-open No. 2009-252453, the relief terminal and ribs are clamped together by a clamping portion of the booster cable, and the clamping portion is held with a tooth of the clamping portion biting into the space between the ribs.

In the structure of the relief terminal described in Japanese Patent Application Laid-open No. 2009-252453, a plurality of ribs are linearly formed along the direction where the relief terminal protrudes. The respective side surfaces of the ribs are arranged parallel to each other so as to limit movement of a tooth of a clip of the booster cable. The movement of the tooth between the ribs is, however, limited only by the side surfaces of the ribs in one direction. This may cause the clip to come off the relief terminal or fall with respect to the relief terminal when a wire of the booster cable is pulled.

In view of the above-mentioned circumstances, it is an object of the present invention to provide a booster cable holding structure that prevents the clip from coming off the relief terminal or falling with respect to the relief terminal.

SUMMARY OF THE INVENTION

It is an object of the present invention to at least partially solve the problems in the conventional technology.

According to one aspect of the present invention, a booster cable holding structure includes a structural body of insulating resin; and a clamping connection portion configured to be clamped by a clip of a booster cable and including a relief terminal and a resin terminal supporting portion, the relief terminal projecting in a plate shape from the structural body, and the resin terminal supporting portion being made of resin and projecting in a plate shape from the structural body with a surface thereof overlapping with the relief terminal, wherein the resin terminal supporting portion includes a tooth-edge surrounding wall on a pressed surface thereof to be pressed by a plurality of teeth arranged in a width direction of a pressing surface of the clip in a state the clip clamps the clamping connection portion, a wall inner surface of the tooth-edge surrounding wall closely surrounds each edge of at least two of the teeth of the clip or closely surrounds the edges of the at least two teeth together.

According to another aspect of the present invention, the structural body includes a fall preventing wall configured to prevent the clip from falling.

According to still another aspect of the present invention, the booster cable holding structure further includes a protection cover configured to protect the relief terminal in a manner of covering the relief terminal, wherein the fall preventing wall locks the protection cover.

According to still another aspect of the present invention, the tooth-edge surrounding wall surrounds two of the teeth provided at both ends in the width direction of the pressing surface of the clip.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram of the periphery of the clamping connection portion illustrated in FIGS. 3A and 3B when viewed from the lower side;

FIGS. 6A and 6B are diagrams for explaining an example of a booster cable with a tooth in a different shape, in which FIG. 6A is a perspective view of the booster cable and FIG. 6B is an enlarged view of the periphery of the tooth;

DETAILED DESCRIPTION OF THE PREFERRED EMBODIMENTS

A preferable embodiment of a booster cable holding structure according to the present invention will now be described in detail with reference to the drawings.

Figure 1:
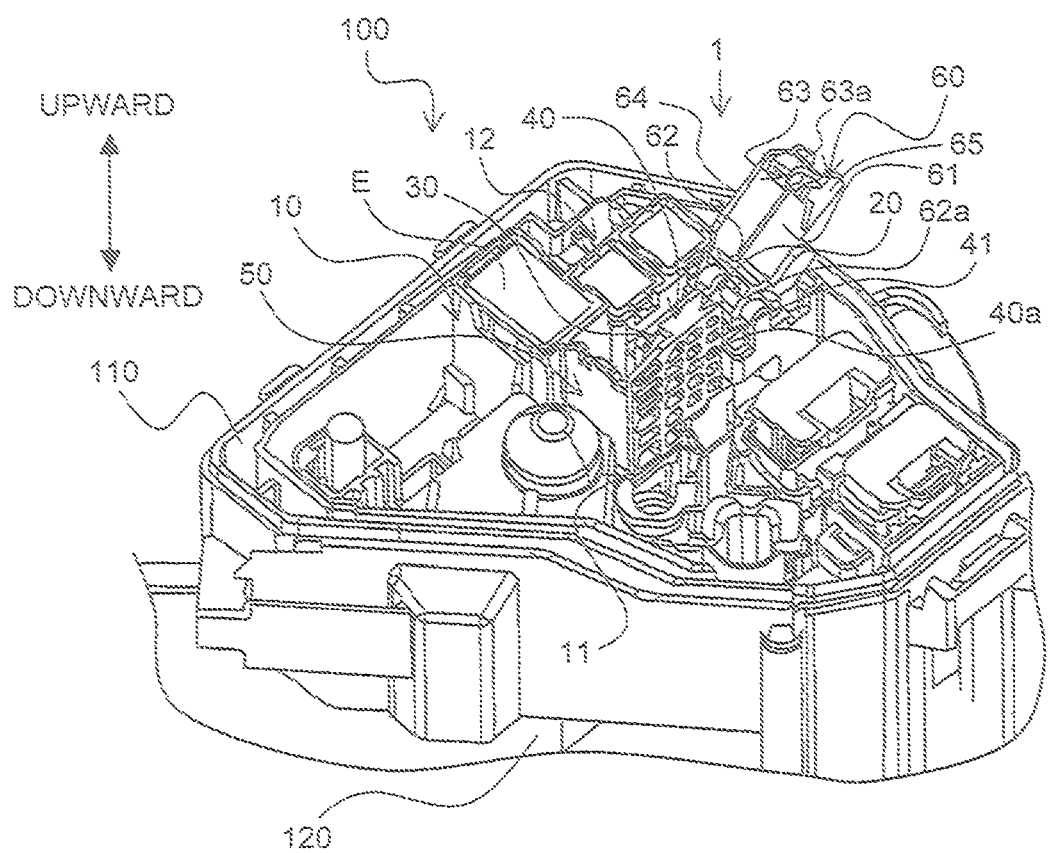
FIG. 1 is a perspective view of an electrical junction box with a booster cable holding structure according to an embodiment of the present invention.
Figure 2:
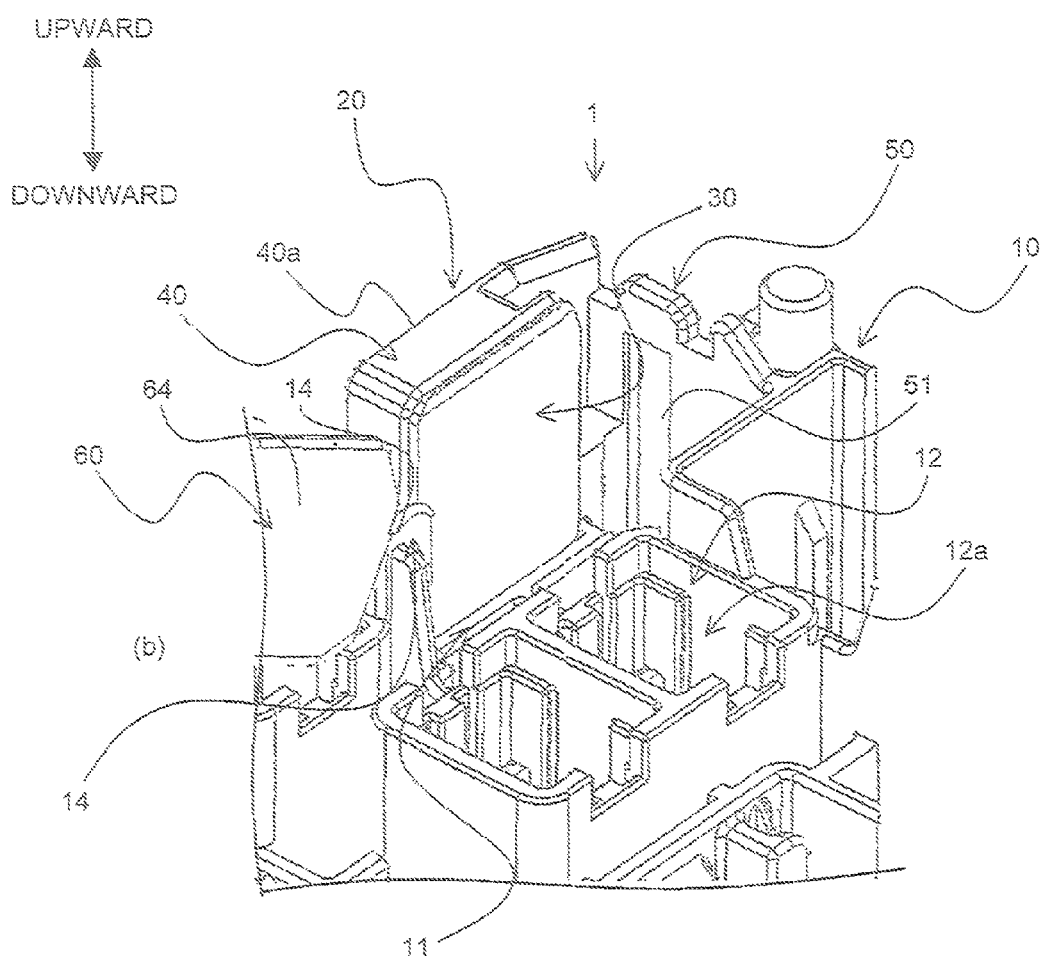
FIG. 2 is a perspective enlarged view of the periphery of a clamping connection portion of a block illustrated in FIG. 1.
Figure 3A:
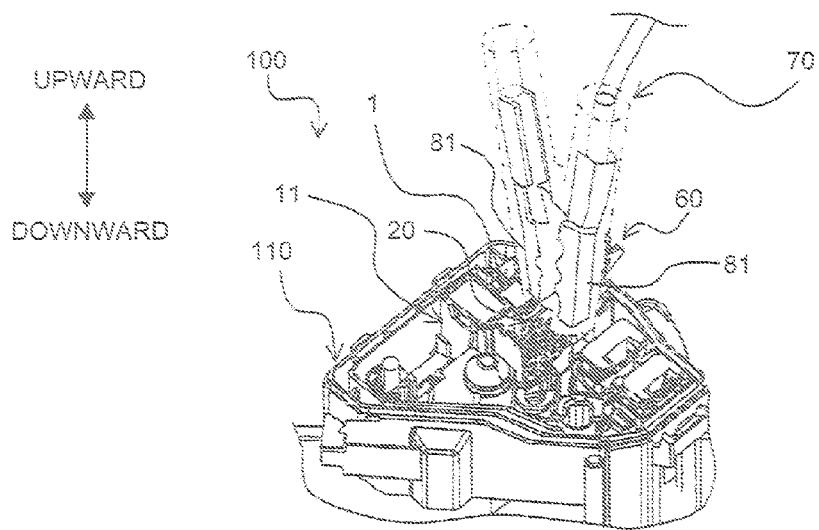
FIG. 3A is a perspective view of the electrical junction box in a state where a booster cable is connected to a relief terminal illustrated in FIG. 1.
Figure 3B:
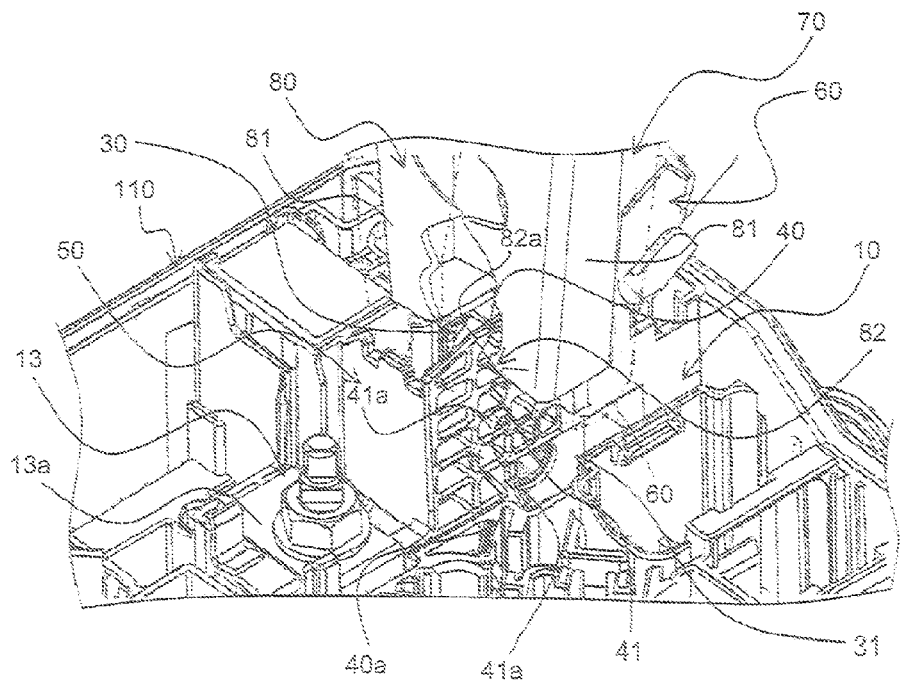
FIG. 3B is an enlarged view of the periphery of the clamping connection portion of FIG. 3A with an exposed power wire connecting portion.

FIG. 1 is a perspective view of an electrical junction box 100 equipped with a booster cable holding structure 1 according to an embodiment of the present invention. FIG. 2 is a perspective enlarged view of the periphery of a clamping connection portion 20 of a block 10 illustrated in FIG. 1. FIG. 3A is a perspective view of the electrical junction box 100 in a state where a booster cable 70 is connected to a relief terminal 30 illustrated in FIG. 1, and FIG. 3B is an enlarged view of the periphery of the clamping connection portion 20 in FIG. 3A with an exposed power wire connecting portion 13. FIG. 4 is a diagram of the periphery of the clamping connection portion 20 illustrated in FIGS. 3A and 3B when viewed from the lower side.

FIGS. 3A, 3B, and FIG. 4 indicate the outline of an insulating cover C for protecting a clip 80 with a virtual line so that the clip 80 is seen through the insulating cover C.

In the embodiment of the present invention, upward and downward directions are referred as indicated in the drawings for convenience of description.

The booster cable holding structure 1 according to the embodiment of the present invention is included in the electrical junction box 100 accommodated in, for example, the engine room of a vehicle. When the battery (not illustrated) disposed in the trunk room of the vehicle is dead, the battery (not illustrated) can be charged through a booster cable 70 connected to the relief terminal 30 of the booster cable holding structure 1 instead of being connected to the battery.

In this embodiment, the booster cable holding structure 1 will be described in detail, citing a general configuration of the electrical junction box 100.

The electrical junction box 100 includes the block 10 provided with the booster cable holding structure 1, a cylindrical case body 110 mounting thereon the block 10, an upper cover (not illustrated) for covering the upper opening of the case body 110, and a lower cover for covering the lower opening of the case body 110.

The block 10 includes a bus bar 31 forming a conductive path of the electrical junction box 100 in a block body 11 made of insulating resin. The block 10 also includes an electrical/electronic component inserting portion 12 to which an electrical/electronic component E is mounted, a power wire connecting portion 13 to which a power wire (not illustrated) connected to the battery (not illustrated) is connected, and the booster cable holding structure 1.

The bus bar 31 is a plate metallic member fabricated by punch press work. A part of the bus bar 31 forms the relief terminal 30 and the power wire connecting portion 13.

The electrical/electronic component inserting portion 12 has a plurality of component inserting chambers 12a divided by a partition so as to correspond to respective electrical/electronic components E, with respective inserting slots opening upward so that the electrical/electronic components E are inserted in the respective part inserting chambers 12a from the upper surface side of the block 10.

The electrical/electronic component E is inserted and disposed in the corresponding component inserting chamber 12a to be connected to a terminal part (not illustrated), and thus coupled electrically to a wire (not illustrated) or the like through the terminal part.

As illustrated in FIG. 3, in the power wire connecting portion 13, a terminal of a power wire (not illustrated) connected to the positive electrode of a battery (not illustrated) is screwed to a plate metallic member 13a with a bolt B and a nut N. The relief terminal 30 and the power wire (not illustrated) are connected electrically with each other by connecting the plate metallic member 13a to the bus bar 31.

The booster cable holding structure 1 includes the clamping connection portion 20. The clamping connection portion 20 includes the relief terminal 30 projecting in a plate shape from the block body 11 as a structural body of insulating resin and a resin terminal supporting portion 40 projecting in a plate shape from the block body 11 with a surface thereof to the relief terminal 30. The clamping connection portion 20 can be clamped by the clip 80 of the booster cable 70.

The relief terminal 30 is disposed so that a part of the bus bar 31 projects upward over the upper end edge surface of the outer peripheral wall of the case body and a surface of the relief terminal 30 overlaps with the resin terminal supporting portion 40.

The resin terminal supporting portion 40 is made of the same insulating resin material as the block body 11 and is formed integrally with the block body 11.

The resin terminal supporting portion 40 projects upward along a surface of the relief terminal 30 and has its projecting end surface substantially aligned with that of the relief terminal 30. With this structure, the resin terminal supporting portion 40 serves as a supporting portion of the relief terminal 30.

In the clamping connection portion 20 including the relief terminal 30 and the resin terminal supporting portion 40 overlapping with each other, the thickness consisting of the relief terminal 30 and the resin terminal supporting portion 40 is adjusted in a thickness that can be clamped by the clip 80.

The resin terminal supporting portion 40 includes a tooth-edge surrounding wall 41 on a surface opposite to the surface overlapping with the relief terminal 30, that is, a surface pressed by the clip 80 of the booster cable 70 (hereinafter referred to as a pressed surface 40a). The tooth-edge surrounding wall 41 has a wall inner surface configured to closely surround each edge 82a of two teeth 82, 82 arranged in the width direction of a pressing surface of the clip 80 when the clip 80 clamps the clamping connection portion 20.

Specifically, the tooth-edge surrounding wall 41 is provided at a position corresponding to each of the two teeth 82, 82 at both ends in the width direction of the pressing surface of the edge of the clip 80.

The tooth-edge surrounding wall 41 corresponding to each of the two teeth 82, 82 has a wall inner surface 41a in a substantially rectangular shape or a substantially triangular shape so that the wall inner surface 41a will closely surround the corresponding tooth 82.

Although the tooth-edge surrounding wall 41 with the wall inner surface 41a in a substantially rectangular shape or a substantially triangular shape has been described as an example, the shape is not limited to these. Any other shape is applicable as long as the wall inner surface 41a can closely surround the tooth 82.

Operation of the clip 80 when a wire of the booster cable is pulled will be described with reference to FIGS. 5A to 5C.

Figure 5A:
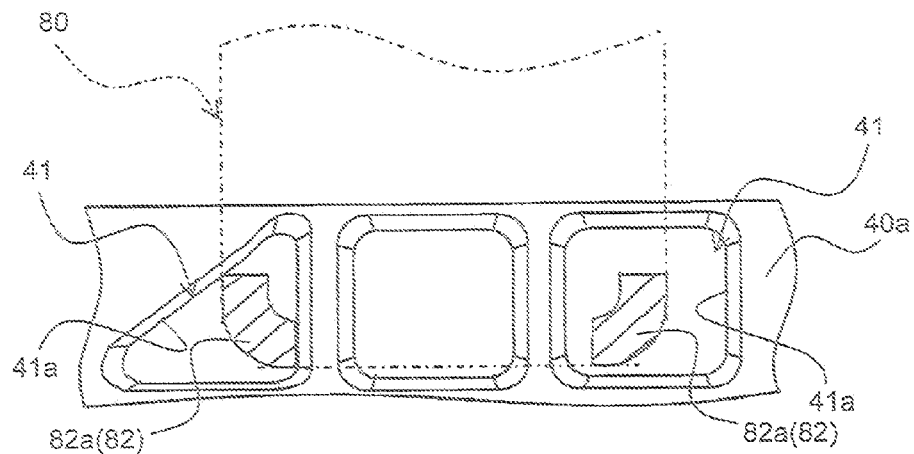
FIGS. 5A to 5C are diagrams illustrating a tooth-edge surrounding wall of the booster cable holding structure, specifically a pressed surface being pressed by two teeth of the clip when viewed from the front side thereof, depicting the teeth in a sectional view and indicating the outline of the clip by an alternate long and short dash line.
Figure 5B:
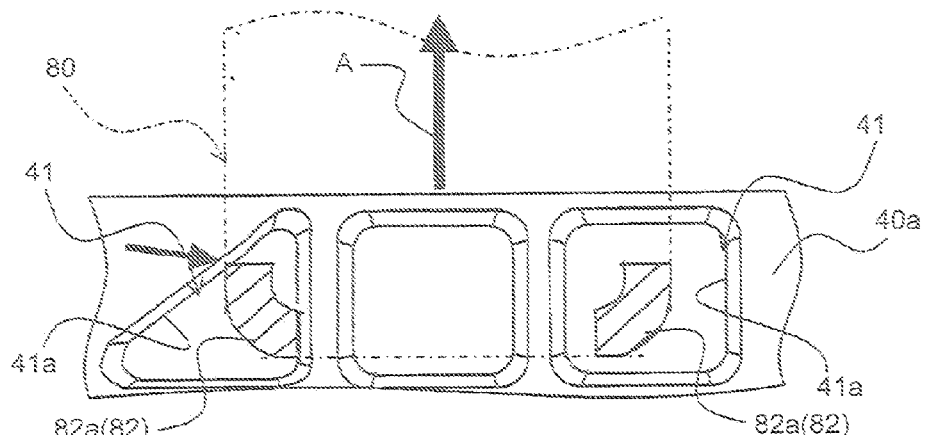
Figure 5C:
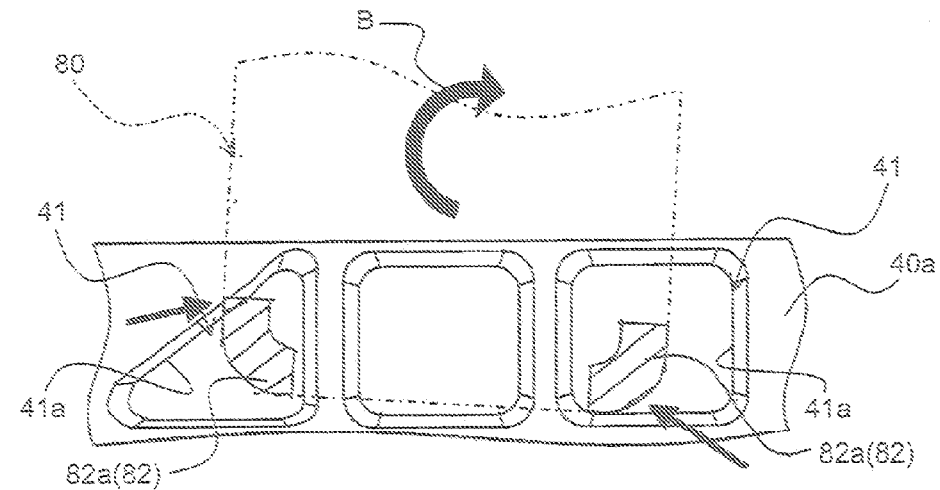

FIGS. 5A to 5C illustrate the tooth-edge surrounding wall 41 of the booster cable holding structure 1, specifically the pressed surface 40a being pressed by the two teeth 82 of the clip 80 when viewed from the front side thereof. The teeth 82 are depicted in a sectional view, and the outline of the clip 80 is indicated by an alternate long and short dash line.

As illustrated in FIG. 5B, for example, when the clip 80 starts to be moved upward as indicated by the arrow A in FIG. 5B, each of the edges 82a of the teeth 82 comes into contact with the corresponding wall inner surface 41a of the tooth-edge surrounding wall 41. This prevents the clip 80 from coming off the relief terminal 30.

As illustrated in FIG. 5B, for example, when the clip 80 nearly falls by being turned as indicated by the arrow B in FIG. 5B, each of the edges 82a of the teeth 82 comes into contact with the corresponding wall inner surface 41a of the tooth-edge surrounding wall 41. This prevents the clip 80 from tilting with respect to the relief terminal 30.

The tooth-edge surrounding wall 41 surrounds each of the two teeth 82 formed at both ends in the width direction of the pressing surface of the clip 80. In particular, the tooth-edge surrounding wall 41 can surround each of the two teeth 82 formed with as a large space as possible therebetween in the width direction of the pressing surface of the clip 80. Thus, when the clip 80 nearly falls due to the rotation indicated by the arrow B, the clip 80 moves with one of the teeth 82 displaced in a larger movement amount than that of the other tooth 82. The tooth 82 with a larger movement amount comes into contact with the corresponding tooth-edge surrounding wall 41 surrounding the tooth 82. This prevents the clip 80 from tilting.

Figure 6A:
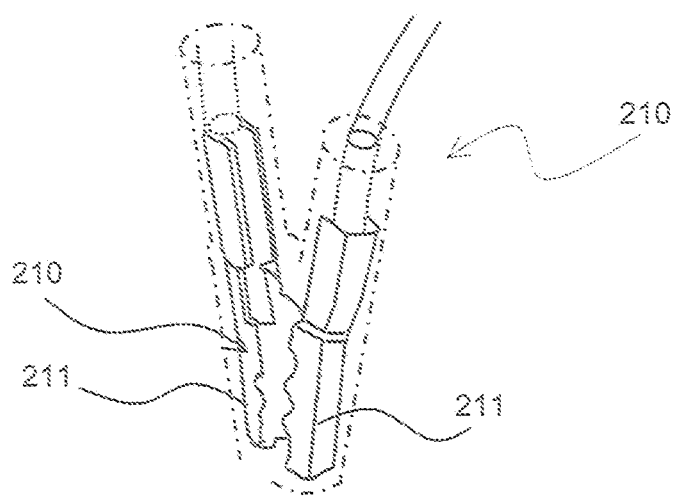
Figure 6B:
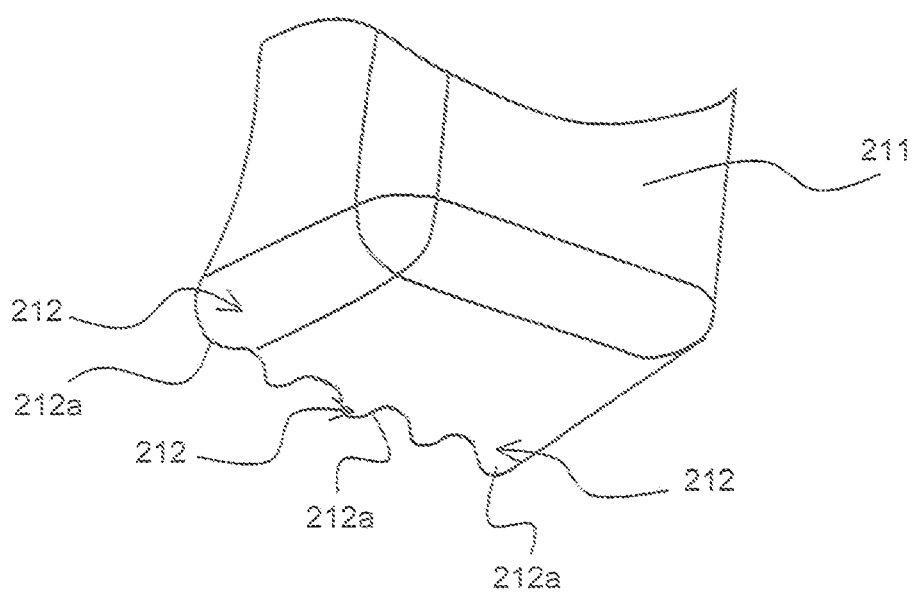

In this embodiment, the tooth-edge surrounding wall 41 is formed at two positions on the pressed surface 40a, the positions corresponding to the two respective teeth 82 on the edge of the clip 80. Furthermore, a plurality of tooth-edge surrounding walls 41 are arranged successively in the horizontal and vertical directions on the pressed surface 40a so as to correspond to more than one tooth 82 or to another clip different from the clip 80 in this embodiment. For example, as illustrated in FIGS. 6A and 6B, when a booster cable 200 is used that includes a clip 210 having teeth 212 of a clamping piece 211 formed successively in the width direction of the pressing surface, each edge 212a of the teeth 212 aligned in the width direction of the pressing surface of the clip 210 can be surrounded by the tooth-edge surrounding wall 41.

The booster cable holding structure 1 includes a fall preventing wall 50 that prevents the clip 80 from falling.

The fall preventing wall 50 is made of insulating resin and formed integrally with the block body 11. When the clip 80 changes its posture to tilt from a normal posture, a clamping piece 81 pressing the relief terminal 30 as one of a pair of clamping pieces 81, 81 of the clip 80 abuts the fall preventing wall 50. This prevents the clip 80 from falling.

The fall preventing wall 50 is disposed beside the clamping piece 81 pressing the relief terminal 30 in a state where the clip 80 clamps the clamping connection portion 20.

The fall preventing wall 50 also serves as a wall to lock a protection cover 60 described later. Specifically, the fall preventing wall 50 has a locking groove 51 that locks a locking projection 63a of the protection cover 60 described later. The protection cover 60 is locked while mounted on the clamping connection portion 20 with the locking projection 63a of the protection cover 60 locked by the locking groove 51.

The booster cable holding structure 1 is protected with the relief terminal 30 covered with the protection cover 60.

The protection cover 60 has a rectangular ceiling wall 61 and also includes a supporting-point-side wall 62, an elastic locking piece 63, a terminal covering wall 64, and a supporting-side wall 65 that stand on the four respective sides of the edge surface of the ceiling wall 61. The protection cover 60 is made of insulating resin and covers the clamping connection portion 20 from the upper side.

The supporting-point-side wall 62 has a shaft 62a in which the protection cover 60 is rotatably supported by a rotary supporting portion 14 provided to the block body 11.

The elastic locking piece 63 is disposed at a side facing the supporting-point-side wall 62 and includes an elastic locking piece to be locked by the locking groove 51 of the fall preventing wall 50. The protection cover 60 is locked by the fall preventing wall 50 so as not to rotate by means of the locking projection 63a of the elastic locking piece 63 interlocked with the locking groove 51.

The terminal covering wall 64 covers the relief terminal 30. In particular, the terminal covering wall 64 covers a surface of the relief terminal 30 in a state where the protection cover 60 is locked by the fall preventing wall 50.

The supporting side wall 65 is disposed facing the terminal covering wall 64.

The protection cover 60 is rotatably supported by the rotary supporting portion 14 of the block body 11, and this enables the protection cover 60 to be put on and off the relief terminal 30.

In the booster cable holding structure 1 according to the embodiment of the present invention, the wall inner surface 41a of the tooth-edge surrounding wall 41 can closely surround each of the two teeth 82, 82 arranged in the width direction of the pressing surface of the clip 80. The wall inner surface 41a can come into contact with each of the teeth 82 to prevent the teeth 82 from moving. When the clip 80 nearly tilts with one of the teeth 82 as a rotary supporting point, the other tooth 82, which does not serve as the rotary supporting point and has a larger movement amount, will come into contact with the corresponding wall inner surface 41a. This keeps the position and posture of the clip 80 normal and consequently prevents the clip 80 of the booster cable 70 from coming off the relief terminal 30 or falling with respect to the relief terminal 30.

The booster cable holding structure 1 according to the embodiment of the present invention prevents the clip 80 from falling by means of the fall preventing wall 50. The use of the fall preventing wall 50 together with the tooth-edge surrounding wall 41 further enhances the function of preventing the clip 80 from falling.

In the booster cable holding structure 1 according to the embodiment of the present invention, the fall preventing wall 50 serves as a wall for locking the protection cover 60. No additional walls are thus required for the fall preventing wall 50.

In the booster cable holding structure 1 according to the embodiment of the present invention, the tooth-edge surrounding wall 41 can surround each of the two teeth 82 formed with as a large space as possible therebetween in the width direction of the pressing surface of the clip 80. This increases the movement amount of the tooth 82 that does not serve as the rotary supporting point and thus enables easier detection of the movement. Furthermore, this makes it possible to sense changes of the position and posture of the clip 80 more exactly. In this way, the tooth 82 in contact with the wall inner surface 41a more certainly prevents the clip 80 of the booster cable 70 from coming off the relief terminal 30 or falling with respect to the relief terminal 30.

Modification

A modification of the booster cable holding structure 1 according to the embodiment of the present invention will now be described with reference to FIG. 7, FIGS. 8A and 8B.

Figure 7:
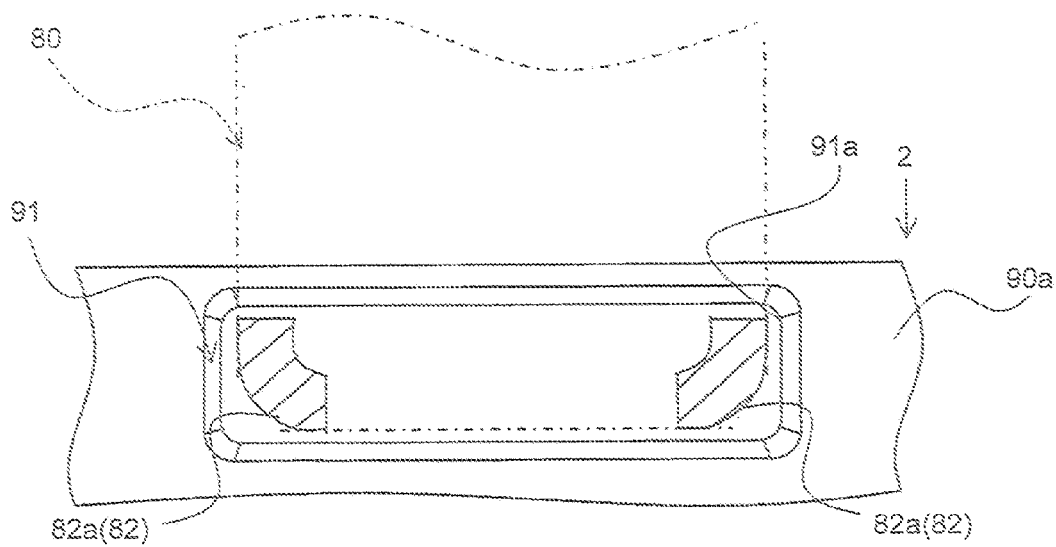
FIG. 7 is a diagram illustrating a tooth-edge surrounding wall of another booster cable holding structure as a modification of the booster cable holding structure according to the embodiment of the present invention, specifically a pressed surface being pressed by the two teeth of the clip when viewed from the front side thereof, depicting the teeth in a sectional view and indicating the outline of the clip by an alternate long and short dash line.

FIG. 7 illustrates a tooth-edge surrounding wall 91 of a booster cable holding structure 2 as a modification of the booster cable holding structure 1 according to the embodiment of the present invention, specifically a pressed surface 90a being pressed by the two teeth of the clip 80 when viewed from the front side thereof. The teeth 82 are depicted in a sectional view, and the outline of the clip 80 is indicated by an alternate long and short dash line.

Figure 8A:
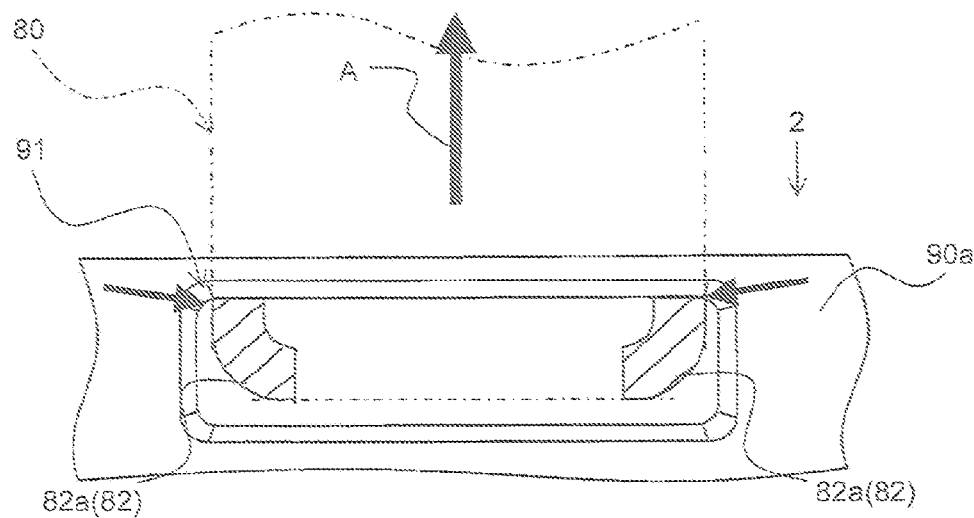
FIGS. 8A and 8B are diagrams for explaining motion of the clip when a wire of the booster cable is pulled.
Figure 8B:
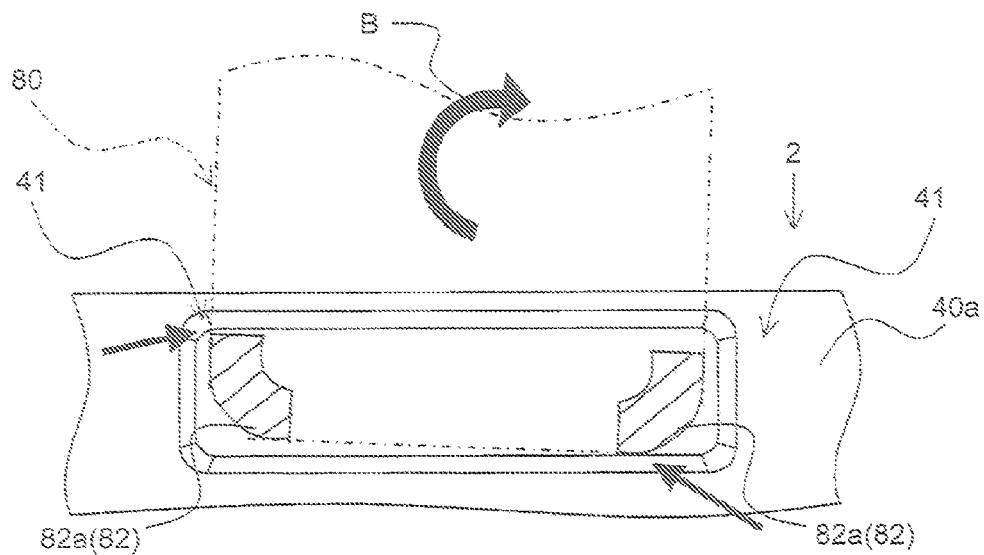

FIGS. 8A and 8B are diagrams for explaining motion of the clip 80 when a wire of the booster cable is pulled.

The booster cable holding structure 2 in this modification is different from the booster cable holding structure 1 of the embodiment in that a wall inner surface 91a of the tooth-edge surrounding wall 91 can closely surround the edges 82a of the two teeth 82, 82 together.

It should be noted that the other configurations are the same as those of the embodiment, and like components as the embodiment are indicated by like numerals.

The tooth-edge surrounding wall 91 is provided on the pressed surface 90a of a resin terminal supporting portion 90 that is to be pressed by the two teeth 82, 82 of the clip 80. When the clip 80 clamps the clamping connection portion 20, the wall inner surface 91a will closely surround the edges of the two teeth 82, 82 together that are arranged in the width direction of the pressing surface of the clip 80.

As illustrated in FIG. 8A, for example, when the clip 80 starts to be moved upward as indicated by the arrow A in FIG. 8A, the edges of the teeth 82 come into contact with the wall inner surface 91a of the tooth-edge surrounding wall 91. This prevents the clip 80 from coming off the relief terminal 30.

As illustrated in FIG. 8B, for example, when the clip 80 nearly falls as a result of rotating as indicated by the arrow B in FIG. 8B, the edges 82a of the teeth 82 come into contact with the wall inner surface 91a of the tooth-edge surrounding wall 91. This prevents the clip 80 from tilting with respect to the relief terminal 30.

The tooth-edge surrounding wall 91 can surround the two teeth 82, 82 formed at both ends in the width direction of the clip 80. In particular, the tooth-edge surrounding wall 91 can surround the two teeth 82, 82 formed with as a large space as possible therebetween in the width direction of the clip 80. Thus, when the clip 80 nearly falls due to the rotation indicated by the arrow B, the clip 80 is moved so that the movement amount of one of the teeth 82 is larger than that of the other tooth 82. Consequently, the tooth 82 with a larger movement amount comes into contact with the tooth-edge surrounding wall 91 surrounding the tooth 82, and this prevents the clip 80 from tilting.

With the booster cable holding structure 2 in the modification, the wall inner surface 91a of the tooth-edge surrounding wall 91 can closely surround the edges 82a of the two teeth 82, 82 together that are arranged in the width direction of the pressing surface of the clip 80. The wall inner surface 91a can come into contact with the two teeth 82, 82 so as to prevent the teeth 82 from moving. When the clip 80 nearly tilts with one of the teeth 82 as a rotary supporting point, the other teeth 82 that does not serve as the rotary supporting point and has a larger movement amount comes into contact with the wall inner surface 91a. This keeps the position and posture of the clip 80 normal and thus exerts the similar effect as that in the booster cable holding structure 1 of the embodiment.

The booster cable holding structures 1 and 2 according to the embodiments of the present invention are installed to the electrical junction box 100, but not limited to this configuration. The booster cable holding structures 1 and 2 may be installed in another construction.

The booster cable holding structures 1 and 2 according to the embodiments of the present invention have the fall preventing wall 50. However, another configuration without the fall preventing wall 50 is also applicable.

In the booster cable holding structure according to one aspect of the present invention, the wall inner surface of the tooth-edge surrounding wall can closely surround each edge of at least two teeth arranged in the width direction of the pressing surface of the clip or closely surround the edges of the teeth together. The wall inner surface can come into contact with the teeth to prevent the teeth from moving. Furthermore, when the clip nearly tilts with one of the teeth as a rotary supporting point, the other tooth, which does not serve as the rotary supporting point and has a larger movement amount, will come into contact with the wall inner surface. This keeps the position and posture of the clip normal and consequently prevents the clip from coming off the relief terminal or falling with respect to the relief terminal.

In the booster cable holding structure according to another aspect of the present invention, the fall preventing wall prevents the clip from falling. The use of the fall preventing wall together with the tooth-edge surrounding wall further enhances the function to prevent the clip from falling.

In the booster cable holding structure according to still another aspect of the present invention, the fall preventing wall serves as a wall to lock the protection cover, and thus no additional walls are required for the fall preventing wall.

In the booster cable holding structure according to still another aspect of the present invention, the tooth-edge surrounding wall can surround the two teeth formed with as a large space as possible therebetween in the width direction of the pressing surface of the clip. This increases the movement amount of the tooth that does not serve as the rotary supporting point and enables easier detection of the movement. Furthermore, this makes it possible to sense changes of the position and posture of the clip more exactly. In this way, the tooth in contact with the wall inner surface more certainly prevents the clip of the booster cable from coming off the relief terminal or falling with respect to the relief terminal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A booster cable holding structure comprising: a structural body of insulating resin; and a clamping connection portion configured to be clamped by a clip of a booster cable and including a relief terminal and a resin terminal supporting portion, the relief terminal projecting in a plate shape from the structural body, and the resin terminal supporting portion being made of resin and projecting in a plate shape from the structural body with a surface thereof overlapping with the relief terminal, wherein the resin terminal supporting portion includes a first surface overlapping with the relief terminal, a second surface opposite to the first surface, and a tooth-edge surrounding wall on the second surface and extending away from the first surface and the second surface, the second surface is a pressed surface to be pressed by a plurality of teeth arranged in a width direction of a pressing surface of the clip in a state the clip clamps the clamping connection portion, and a wall inner surface of the tooth-edge surrounding wall closely surrounds each edge of at least two of the teeth of the clip or closely surrounds the edges of the at least two teeth together, so that each edge of the at least two of the teeth comes in contact with the corresponding wall inner surface of the tooth edge surrounding wall.

2. The booster cable holding structure according to claim 1, wherein
the structural body includes a fall preventing wall configured to prevent the clip from falling.

3. The booster cable holding structure according to claim 2, further comprising:
a protection cover configured to protect the relief terminal in a manner of covering the relief terminal, wherein
the fall preventing wall locks the protection cover.

4. The booster cable holding structure according to claim 3, wherein
the tooth-edge surrounding wall surrounds two of the teeth provided at both ends in the width direction of the pressing surface of the clip.

5. The booster cable holding structure according to claim 2, wherein
the tooth-edge surrounding wall surrounds two of the teeth provided at both ends in the width direction of the pressing surface of the clip.

6. The booster cable holding structure according to claim 1, wherein
the tooth-edge surrounding wall surrounds two of the teeth provided at both ends in the width direction of the pressing surface of the clip.

* * * * *